US009970663B2

United States Patent
Ortmann

(10) Patent No.: US 9,970,663 B2
(45) Date of Patent: May 15, 2018

(54) STOVE TOP HAVING A COOKING ZONE AND A REDUCED SYMBOL DEPICTION IN THE COOKING ZONE IN A DISPLAY UNIT AND METHOD FOR OPERATING A STOVE TOP

(71) Applicant: BSH Hausgeräte GmbH, Munich (DE)

(72) Inventor: Christoph Ortmann, München (DE)

(73) Assignee: BSH Hausgeräte GmbH, Munich (DE)

( * ) Notice: Subject to any disclaimer, the term of this patent is extended or adjusted under 35 U.S.C. 154(b) by 139 days.

(21) Appl. No.: 14/784,973

(22) PCT Filed: Apr. 8, 2014

(86) PCT No.: PCT/EP2014/056984
§ 371 (c)(1),
(2) Date: Oct. 16, 2015

(87) PCT Pub. No.: WO2014/170161
PCT Pub. Date: Oct. 23, 2014

(65) Prior Publication Data
US 2016/0084507 A1    Mar. 24, 2016

(30) Foreign Application Priority Data
Apr. 16, 2013    (DE) .......... 10 2013 206 758

(51) Int. Cl.
*H05B 3/68* (2006.01)
*H05B 1/02* (2006.01)
(Continued)

(52) U.S. Cl.
CPC .............. *F24C 7/083* (2013.01); *H05B 3/68* (2013.01); *H05B 6/1209* (2013.01); *H05B 2213/03* (2013.01); *Y02B 40/123* (2013.01)

(58) Field of Classification Search
CPC ........ F24C 7/083; F24C 7/00; H05B 2213/03; H05B 3/68; H05B 6/1209; H05B 2213/05; H05B 6/062; Y02B 40/123
(Continued)

(56) References Cited

U.S. PATENT DOCUMENTS 5,764,280 A * 6/1998 Bloom ................... B60K 35/00
                                                            345/8
2004/0089466 A1    5/2004 Schilling et al.
(Continued)

FOREIGN PATENT DOCUMENTS

| DE | 8913602 U1 | 1/1990 |
| DE | 102004034761 A1 | 2/2006 |

(Continued)

OTHER PUBLICATIONS

International Search Report PCT/EP2014/056984 dated Jun. 18, 2014.

*Primary Examiner* — Sang Y Paik
(74) *Attorney, Agent, or Firm* — Michael E. Tschupp; Andre Pallapies; Brandon G. Braun

(57) ABSTRACT

A stove top includes a stove top plate having at least one area-connected cooking zone for placement of an item of cookware in variable positions. Formed on the stove top plate is a display unit for displaying information about a position of the item of cookware on the cooking zone. The display unit has a first display field in which a plurality of separate display regions are fixedly arranged adjacent to one another, with each display region displaying a reduced symbol depiction of the entire cooking zone. Lighting devices are assigned to the symbol depictions of the display regions, respectively, to illuminate the symbol depictions in at least a plurality of partial areas having different surfaces and/or different surface-areas.

25 Claims, 4 Drawing Sheets

(51) Int. Cl.
 *F24C 7/08* (2006.01)
 *H05B 6/12* (2006.01)
(58) Field of Classification Search
 USPC .................................. 219/443.1–468.2, 518
 See application file for complete search history.

(56) References Cited

U.S. PATENT DOCUMENTS

| | | | |
|---|---|---|---|
| 2005/0029245 A1* | 2/2005 | Gerola | H05B 3/746 |
| | | | 219/447.1 |
| 2010/0243642 A1 | 9/2010 | Gouardo et al. | |
| 2011/0226753 A1* | 9/2011 | Casanova Lacueva | F24C 7/083 |
| | | | 219/462.1 |
| 2011/0303653 A1 | 12/2011 | Chun et al. | |

FOREIGN PATENT DOCUMENTS

| | | |
|---|---|---|
| DE | 102011087217 A1 | 5/2013 |
| EP | 2330355 A1 | 6/2011 |
| EP | 2709422 A1 | 3/2014 |
| FR | 2984463 A1 | 6/2013 |
| WO | 2009053179 A1 | 4/2009 |

* cited by examiner

STOVE TOP HAVING A COOKING ZONE AND A REDUCED SYMBOL DEPICTION IN THE COOKING ZONE IN A DISPLAY UNIT AND METHOD FOR OPERATING A STOVE TOP

BACKGROUND

The invention relates to a stove top having a stove top plate on which at least one area-connected cooking zone is formed, an item of cookware being able to be placed thereon in variable positions. The stove top further comprises a display unit formed on the stove top plate for displaying information about the position of the item of cookware on the cooking zone. The invention further relates to a method for operating such a stove top.

Stove tops are known from the prior art, said stove tops having a cooking zone, the surface area thereof being dimensioned to be sufficiently large that an item of cookware, such as for example a pan or pot or the like, may be placed in different positions on this cooking zone and the surface thereof may be heated. For example, this cooking zone is formed in induction stove tops which have a plurality of inductors below the stove top plate and, as a result, a correspondingly large cooking zone may be formed. In particular, such stove tops also comprise a pot recognition device, the position of the item of cookware placed thereon being identified thereby on this large cooking zone and then only those heating units, in particular inductors, on which the item of cookware is arranged so as to partially cover said heating units with the base, are activated.

A stove top is also disclosed in EP 2 330 355 A1 in which an item of cookware may be placed in variable positions on such a large cooking zone. A display unit is configured adjacent to the cooking zone toward the front edge of the stove top plate. This display unit comprises a display field, the cooking phase of the region where the item of cookware has been placed being displayed therein. The position of this display field may be automatically displaced, wherein this is dependent on the respective position of the item of cookware on the cooking zone.

Such a display is limited regarding the representation of information included therein.

BRIEF SUMMARY OF THE INVENTION

The object of the present invention is to provide a stove top and a method by which and/or in which the information content is able to be understood in a more comprehensive and intuitive manner by a user when placing an item of cookware on such large cooking zones.

This object is achieved by a stove top in a method according to the independent claims.

A stove top according to the invention has a stove top plate on which at least one area-connected cooking zone is formed, said cooking zone being dimensioned in terms of its surface area such that an item of cookware is able to be placed thereon in variable positions and thus is able to be positioned at a plurality of different positions on this cooking zone, whilst the entire base and thus the entire surface of the item of cookware in these different positions are entirely arranged within the surface-area of the cooking zone. This means that the cooking zone is designed in terms of surface-area such that even a plurality of items of cookware are able to be placed and heated simultaneously at different positions on the cooking zone and in each case with the entire bottom surface within the surface-area of the cooking zone. The stove top also comprises a display unit formed on the stove top plate, said display unit being configured for displaying information about the position of the item of cookware on the cooking zone. An essential idea of the invention is that the display unit has a first display field in which a plurality of separate fixed display regions are arranged adjacent to one another, and in each case a reduced fixed symbol depiction of the entire cooking zone is displayed in the display regions. Each symbol depiction is able to be illuminated by one respective lighting device in at least a plurality of partial areas having different surfaces and/or different surface-areas. Thus it is provided that the cooking zone is able to be represented by way of symbols, by a plurality of separate symbol depictions also representing in each case the entire cooking zone by way of symbols. A lighting device assigned to a symbol depiction permits the optical display of the position of the item of cookware on the cooking zone, in a display by way of symbols in the respective symbol depiction. By means of such an embodiment, the occupied positions in the cooking zone may be represented to a user in a manner which is more informative and more intuitively comprehensible.

It is preferably provided that each symbol depiction is constructed from a plurality of light sources of the lighting device forming part of the symbol depiction, said light sources being arranged geometrically according to the surface of the cooking zone. The representation of partial areas on which an item of cookware is located on the cooking zone is thereby possible in a more accurate manner.

Preferably, it is provided that the light sources are arranged in a matrix, in particular in at least a 5×5 matrix. As such a symmetrical matrix arrangement also corresponds to the generally square shape of the cooking zone, the display of the respective partial areas on which the item of cookware is located is once again specified by symbols and optically displayed information is able to be understood by the user even more accurately and more easily.

Preferably, the light sources are light-emitting diodes. As a result, the lighting device is able to be of very compact construction and an energy-efficient mode of operation is possible, which is advantageous especially with a plurality of corresponding light sources.

In particular, it is provided that the first display field extends over the entire width of the cooking zone. As a result, in particular with very large cooking zones which extend over at least 90% of the entire width of the stove top plate, this also permits a display of the position by way of symbols on a symbol depiction which is immediately adjacent to the actual partial area region of the cooking zone on which the item of cookware is placed.

Preferably, it is provided that at least four, in particular at least five, symbol depictions are arranged in a row, in particular equally spaced apart and adjacent to one another. The aforementioned advantages are further reinforced thereby and also the space requirement for the symbol depictions is minimized in the depth direction of the stove top plate.

Preferably, it is provided that a value display field is arranged adjacent to a symbol depiction, said value display field serving for the value display of the cooking phase of the partial area of the cooking zones occupied by an item of cookware. Preferably, it is provided that this value display field is arranged laterally adjacent to a symbol depiction. As a result, the allocation of the partial area of the cooking zone is able to be easily identified and the information density very clear to a user, by a single glance. In addition to the accurate positional arrangement of an item of cookware on the cooking zone, which may be identified via the associated symbol depiction, the associated cooking phase is also identified by the value display field arranged immediately adjacent thereto.

Preferably, it is provided that the cooking zone is subdivided into occupied column areas and each symbol depiction for the active optical display of an occupied column area with an item of cookware is correlated with the following occupied column area in the depth direction of the stove top plate, in the longitudinal extension of the symbol depiction. A direct assignment with minimal spacing between the actual cooking zone and/or the partial area and the respective symbol depiction is thereby achieved.

Preferably, it is provided that the stove top has a control unit which is configured, depending on an identification of at least one item of cookware on the cooking zone, to display optically the partial area of the symbol depiction corresponding to that located on the cooking zone and in terms of size to the at least one item of cookware, by activating the lighting device functionally assigned to the symbol depiction.

In particular, it is provided that a control unit of the stove top is configured to detect an alteration to the position of an item of cookware on the cooking zone and to display the position depending on the type of alteration to the position.

Preferably, the control unit is configured to detect an alteration to the position of an item of cookware on the cooking zone and, depending on the type of alteration to the position, to change the display of the position from one symbol depiction to another symbol depiction and/or to display an alteration to the position of the item of cookware on the cooking zone in a single symbol depiction. These alternatives are to be understood that, depending on the distance and direction of the alteration to the position of the item of cookware on the cooking zone, relative to the display the alteration to the position is correspondingly transferred from one symbol depiction to the next or a position is altered on the cooking zone in which such a change of display between the symbol depictions is not required but this alteration to the position is still within an assigned occupied column area which is still correlated with a symbol depiction.

Preferably, it is provided that a control unit is configured such that only the symbol depictions for the optical display are able to be activated by said control unit when the occupied column areas of the cooking zone assigned to said optical display are occupied by an item of cookware. By such an activation and deactivation, the user is prevented from being overwhelmed by information and also the user's attention is able to be directed to the essential information from the activated symbol depictions. As a result, it is possible to reduce the occurrence of misinterpretations by a user of optical displays.

In particular, it is provided that after activating a symbol depiction this remains active for a predeterminable time interval in which the cooking phase may be adjusted by a user. If no such actuation takes place within this time interval, the symbol depiction is automatically deactivated again. As a result, accordingly safety requirements may be met and misinterpretations via the optical displays also reduced.

Preferably, it is provided that the display unit has a second display field which is configured to select a cooking phase of a partial area of the cooking zone occupied by an item of cookware. Preferably, this second display field is integrated in a touch-sensitive operating field so that by touching this operating field a user is able to select the desired cooking phase value which is then displayed in the value display field of the symbol depiction.

Preferably, the second display field is configured as a strip which is arranged parallel to the strip-shaped surface area in which the symbol depictions are configured in a row.

Preferably, it is provided that the second display field is additionally or alternatively positioned such that the first display field is configured between the second display field and the cooking zone, viewed in the depth direction of the stove top plate. This is advantageous in that when selecting a cooking phase, and thus touching the second display field with a finger or another object, the symbol depictions are not covered and thus the visibility of the symbol depictions is not impaired when a cooking phase is selected.

Preferably, it is provided that the second display field with the smallest selectable cooking phase value is located adjacent to the first symbol depiction in the row, in the depth direction. Additionally or alternatively, it may be provided that the second display field with the largest selectable cooking phase value is arranged adjacent to the last symbol depiction in the row, in the depth direction. The cooking phase values which are displayed and shown for selection by way of symbols on the second display field, therefore, extend over substantially the same width as the number of symbol depictions. Improved user-friendliness and clearer presentation of information is thereby achieved.

The invention further relates to a method for operating a stove top having a stove top plate on which at least one area-connected cooking zone is configured. An item of cookware may be placed in variable positions on this cooking zone, wherein information about the position of the item of cookware on the cooking zone is displayed on a display unit configured on the stove top plate. In a first display field of the display unit, a plurality of separate display regions are arranged adjacent to one another and in each case a reduced symbol depiction of the entire cooking zone is displayed in display regions. Each symbol depiction may be illuminated by one respective lighting device in at least a plurality of partial areas of the symbol depiction having different surfaces and/or surface-areas.

Preferably, it is provided that the cooking zone is subdivided into occupied column areas and each symbol depiction for the active optical display of an occupied column area with an item of cookware is correlated with the following occupied column area in the longitudinal extension of the symbol depiction, viewed in the depth direction of the stove top plate.

In particular, it is provided that, depending on an identification of at least one item of cookware on the cooking zone, the partial area of the symbol depiction corresponding to that located on the cooking zone and in terms of size to the at least one item of cookware, is optically displayed by activating the lighting device functionally assigned to the symbol depiction.

Preferably, it is provided that an alteration to the position of an item of cookware on the cooking zone is detected and, depending on the type of alteration to the position, the display of the position is changed from one symbol depiction to another and/or the alteration to the position is displayed in a single symbol depiction.

The stove top preferably also comprises a pot recognition device by which the occupation of a surface of the entire cooking zone by an item of cookware, in terms of location and/or size, may be detected.

Further advantageous embodiments of the stove top according to the invention may be regarded as advantageous embodiments of the method according to the invention.

Further features of the invention are revealed from the claims, the figures and the description of the figures. The features and combination of features cited above in the description as well as the features and combination of features cited hereinafter in the description of the figures and/or shown individually in the figures, are not only able to be used in the respectively provided combination but are also able to be used in other combinations or individually without departing from the scope of the invention. Therefore, embodiments of the invention are also regarded as encompassed and disclosed, said embodiments not being explicitly shown and described in the figures but being revealed and being able to be produced by separate combinations of features from the described embodiments.

BRIEF DESCRIPTION OF THE DRAWINGS

Exemplary embodiments of the invention are described in more detail hereinafter with reference to schematic drawings, in which.

DETAILED DESCRIPTION OF EXEMPLARY EMBODIMENTS OF THE PRESENT INVENTION

Figure 1:
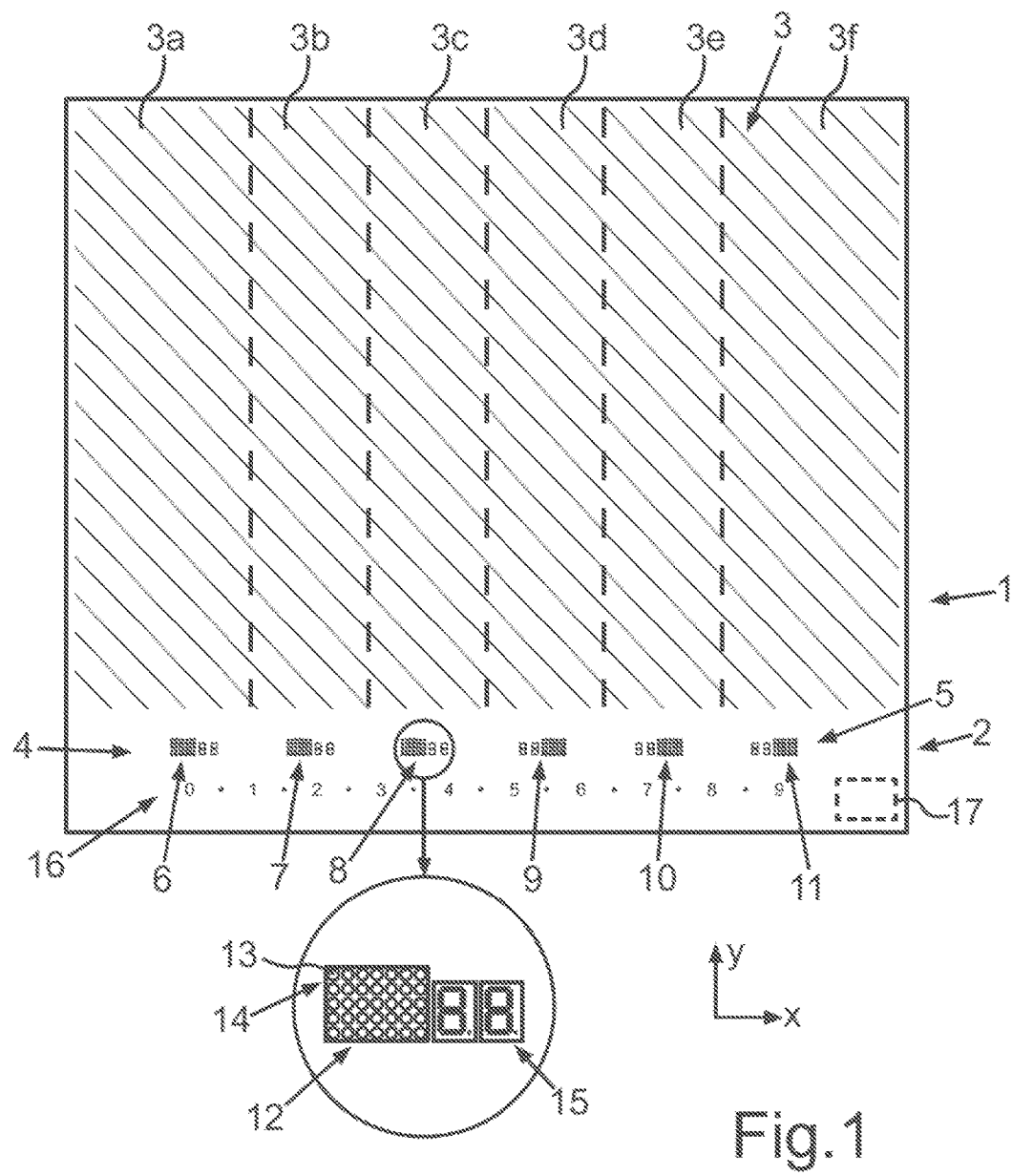
FIG. 1 shows a plan view of an exemplary embodiment of a stove top according to the invention.

In the figures, elements which are the same or functionally the same are provided with the same reference numerals.

A stove top 1 which has a stove top plate 2 which may be formed, for example, from glass or glass ceramic is shown in FIG. 1. The stove top 1 may be configured as an induction stove top. A plurality of heating units are arranged below the stove top plate 2, said heating units being able to be radiation heating elements or inductors, for example.

Said heating units are positioned such that they are able to heat a cooking zone 3 on which an item of cookware may be placed on an upper face of the stove top plate 2 and/or such that they are able to discharge energy via this surface into the item of cookware for appropriate heating.

As may be identified from the view in FIG. 1 the surface marking of the cooking zone 3, shown in strips, extends over at least 80%, preferably over at least 90%, preferably over at least 95% of the width (dimension in the x-direction) of the stove top plate 2. Moreover, it is also provided that this area-connected cooking zone 3 extends over at least 60%, preferably over at least 70%, of the depth (dimension in the y-direction) of the stove top plate 2. The surface-area of the cooking zone 3 is, therefore, sufficiently large that cookware is able to be variously placed at many different positions on this cooking zone 3 and accordingly is able to be individually heated.

To this end, the stove top 1 also comprises a pot identification device, the partial area of the cooking zone 3 which is occupied by a base of an item of cookware being able to be identified thereby. In particular with an induction stove top, therefore, those inductors which are occupied at least over a specific surface area by the base of the item of cookware are able to be activated.

The stove top 1 also comprises a display unit 4 which is configured in front of the cooking zone 3, viewed in the depth direction. The display unit 4 comprises a first display field 5 in which in the exemplary embodiment six display regions 6, 7, 8, 9, 10 and 11 are arranged adjacent to one another in a row and spaced apart from one another. As may be identified with reference to the display region 8, shown enlarged, this display region comprises a fixed symbol depiction 12 which geometrically reduces the entire cooking zone 3 and displays the cooking zone as a symbol. This symbol depiction 12 is constructed from a plurality of light sources 13 which are arranged relative to one another in a matrix, for the sake of clarity only one thereof being provided with the reference numeral. The light sources 13 are light-emitting diodes and form part of a lighting device 14 which in turn is assigned to the symbol depiction 12 and is configured and arranged only for illuminating the symbol depiction 12. A value display field 15 is configured laterally adjacent to the symbol depiction 12, said value display field being adjusted for displaying a set cooking phase of a region occupied by an item of cookware and thus of a partial area of the cooking zone and the heating units arranged therebelow.

The display regions 6 to 11 are configured identically in each case with their own separate fixed symbol depiction 12 and in each case an individual fixed value display field 15 positioned to the side thereof, so that the depiction for the display region 8 also applies to the other display regions.

Moreover, a second display field 16 is provided on the stove top plate 2, said second display field also being formed as a strip and the cooking phase being able to be adjusted thereby in terms of value. Symbolic numerals are also indicated on the stove top plate 2, a user being able to select and adjust the desired cooking area value thereby, by touching the respective regions. In particular, the display unit is integrated within the second display field 16 in a touch-sensitive operating field.

It is provided that the second display field 16 is arranged transversely to the front edge of the stove top plate 2 and thus the first display field 5 extends between the second display field 16 and the cooking zone 3.

Moreover, it is provided that the first symbol depiction 12 in the row and/or the first display region 6 viewed in the depth direction is arranged in front of the smallest value of the cooking phase and the last display region 11 in the row viewed in the depth direction is arranged practically in front of the largest possible adjustment value. As a result, it is provided that the width of the row of display regions 6 to 11 extends according to the width of the row of the possible adjustable values of the cooking phase displayed.

The stove top 1 also comprises a control unit 17, shown merely symbolically, the aforementioned pot identification device being able to be controlled thereby. Moreover, the display unit 4 and the operating device may also be controlled thereby.

It is also provided that the surface of the cooking zone 3 is subdivided into occupied column areas, wherein in the present case the number of occupied column areas 3a, 3b, 3c, 3d, 3e and 3f corresponds to the number of display regions 6 to 11. It is also provided that the width of the occupied column areas 3a to 3f is dimensioned such that an edge is virtually always arranged between two display regions 6 to 11 and thus also between in each case two adjacent symbol depictions 12 with associated value display fields 15. Thus, viewed in the depth direction, in each case a display region 6 to 11 is positioned in the longitudinal extension of the associated occupied column area 3a to 3f. This means that the display region 6 is correlated with the occupied column area 3a, the display region 7 is correlated with the occupied column area 3b, etc.

Each symbol depiction 12 of the cooking zone 3 is able to be illuminated by one respective lighting device 14, at least in a plurality of partial areas having different surfaces and/or surface-areas, wherein this is carried out depending on the partial area of the cooking zone on which an item of cookware is placed.

The control unit 17 is configured, depending on the identification of at least one item of cookware on the cooking zone 3, to display optically the partial area of the symbol depiction 12 corresponding to that located on the cooking zone and in terms of size to the at least to one item of cookware, by activating the lighting device functionally assigned to the symbol depiction 12.

Figure 2:
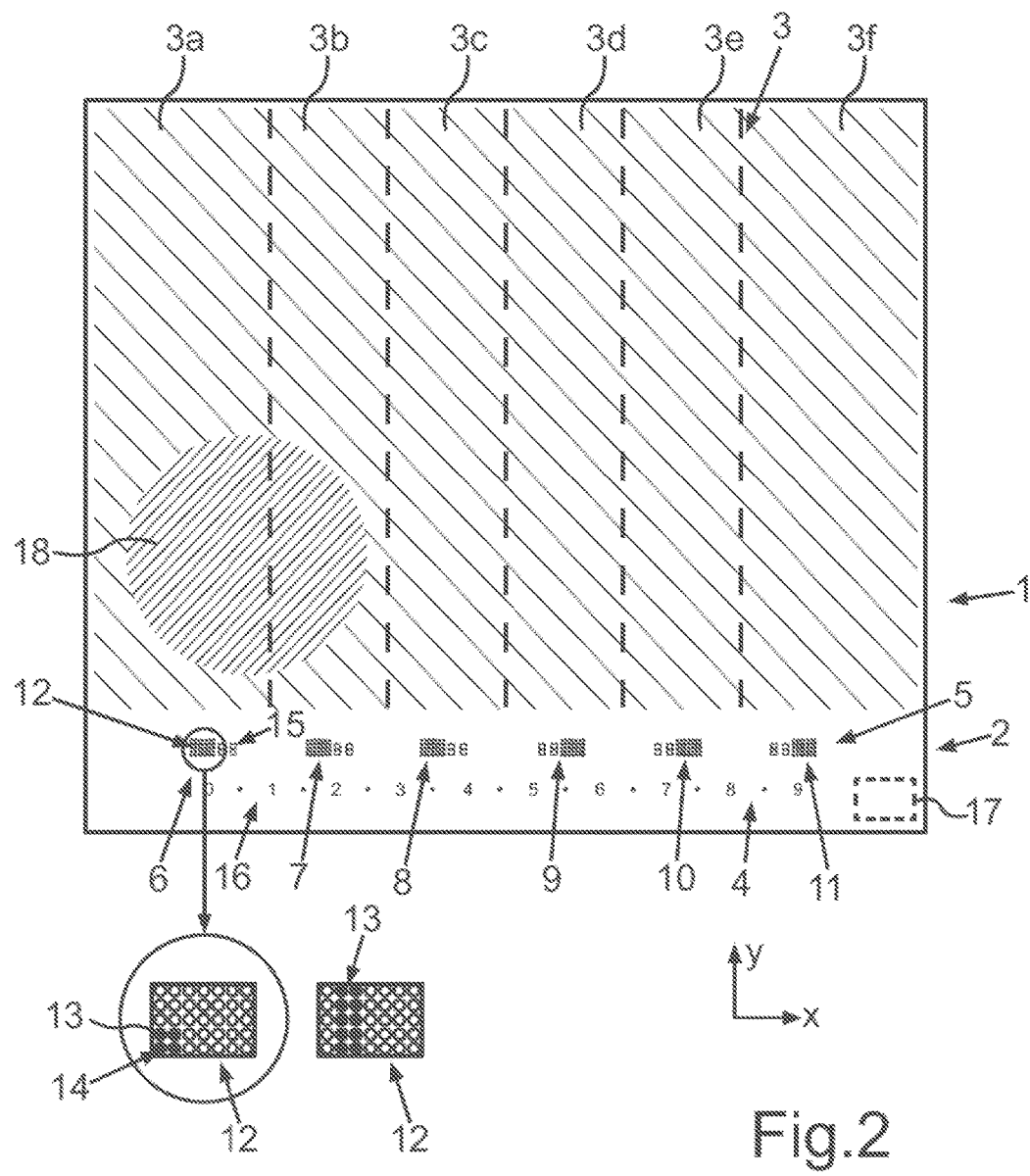
FIG. 2 shows a plan view of an exemplary embodiment of a stove top according to the invention according to FIG. 1 with an item of cookware placed at a specific position on the cooking zone.

Thus in the context according to the view in FIG. 2, an item of cookware 18 is placed in a left-hand front region of the surface of the cooking zone 3. By means of the control unit 17, this is identified and evaluated by the information obtained by the pot identification device. At the same time it is also identified that the base of the item of cookware 18 is located with a larger surface area inside the occupied column area 3a, so that for the depiction by way of symbols of the position of the item of cookware 18 on the cooking zone 3, the display field 6 assigned to the occupied column area 3a is activated by the control unit 17 and also those light sources 13 of the lighting device 14 which are arranged to the left at the front are activated and illuminated, for illuminating the symbol depiction 12 of the display region 6. The number of positionally activated light sources 13 in this case is dependent on the respective bottom surface of the item of cookware 18 so that with larger items of cookware more light sources are positionally activated than with smaller items of cookware.

Furthermore, it is also provided that in the embodiment according to FIG. 2 the further display regions 7 to 11 are deactivated so that in this case no optical information is shown and thus the user is not confused and is able to obtain very accurate information in terms of the location of the position of the item of cookware 18 on the display region 6.

By way of example in FIG. 2, due to the enlarged view of the symbol depiction 12, further examples are shown in which a very large elongated item of cookware is placed on the cooking zone 3, so that the second and third rows of the light sources 13, viewed from the left, are illuminated and thus display by way of symbols the size and position of the item of cookware placed thereon.

Moreover, the pot identification device and thus also the control unit 17, provided for evaluating the information obtained, are configured to detect an alteration to the position of an item of cookware 18 on the cooking zone 3 and, depending on the type of alteration to the position, to change the display of the position on a symbol depiction 12 to a different symbol depiction of a further display region and/or to display the alteration to the position in a single symbol depiction and additionally to activate other light sources.

Figure 3:
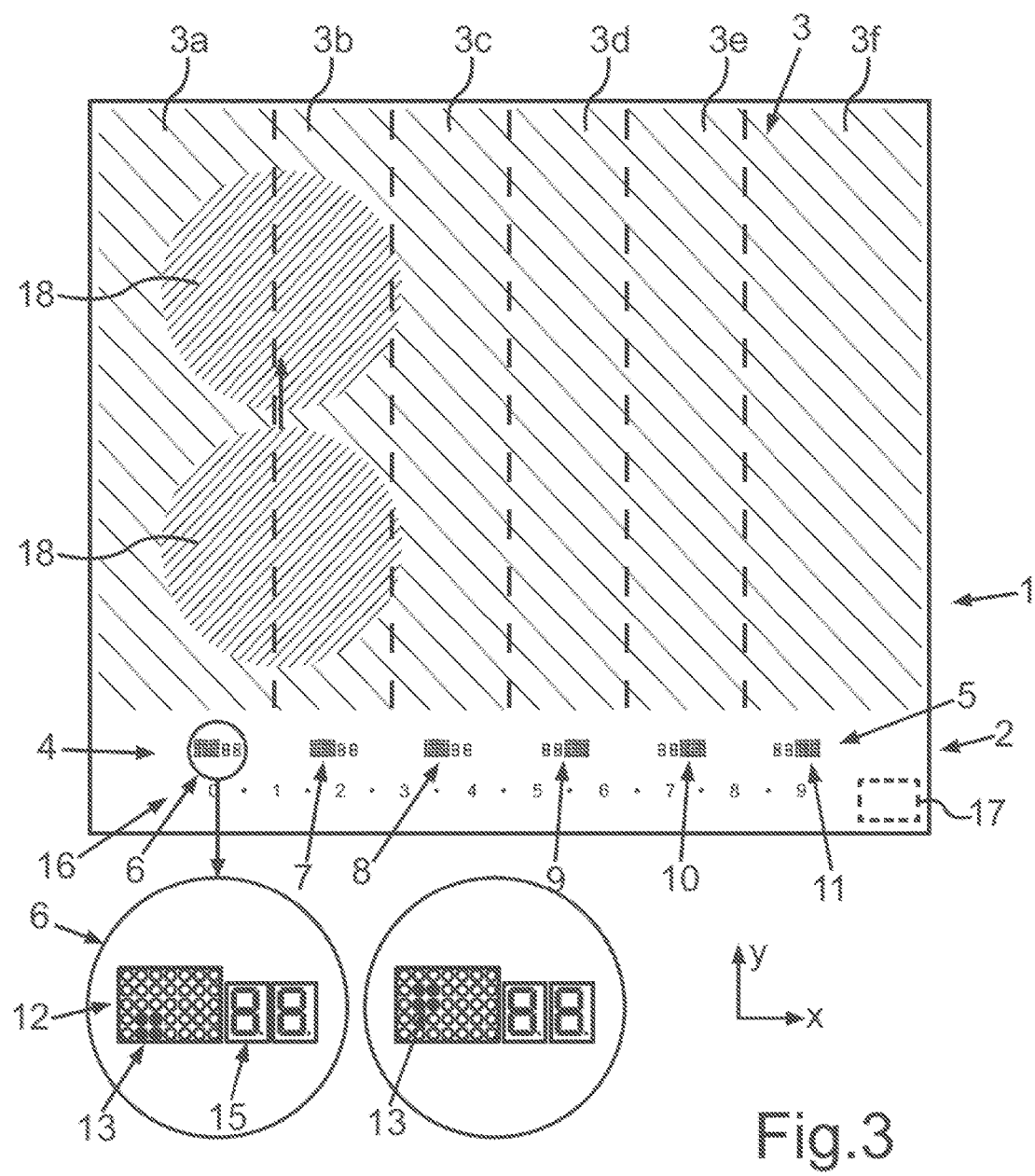
FIG. 3 shows a view of the embodiment in FIG. 2 in which the positioned item of cookware is positionally displaced in a first direction.

Thus in the context of FIG. 3 a situation is shown in which, starting from the view in FIG. 2, the item of cookware 18 has only been displaced in a direction in which once again the larger part of the surface of the base of the item of cookware 18 is located in the occupied column area 3a. In this context, the position of the item of cookware is also optically displayed in the symbol depiction 12 of the display field 6 and the optical display does not change to a symbol depiction 12 of one of the display fields 7 to 11. As may be identified in the enlarged view in FIG. 3 of the display field 6, the light sources 13 of the original position are deactivated and other light sources 13 of the matrix arrangement are activated, whereby the alteration to the position of the item of cookware is also displayed by way of symbols.

Figure 4:
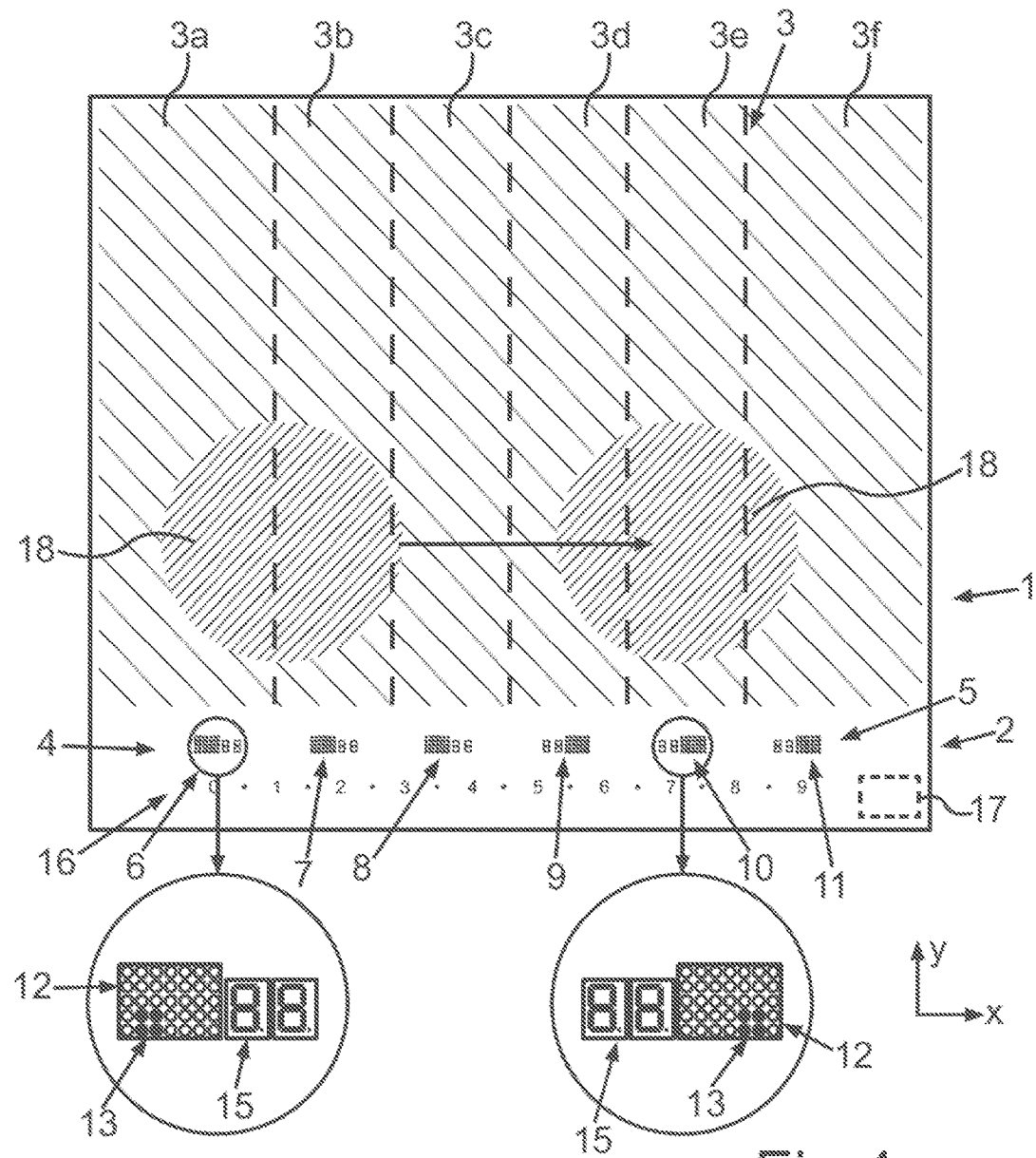
FIG. 4 shows a plan view of the view according to FIG. 2 in which the item of cookware is positionally displaced in a second direction.

In the view in FIG. 4, however, starting from the original position of the item of cookware 18, a displacement is carried out in a different direction from FIG. 3 and in this context the item of cookware 18 is displaced in the width direction. In this case the optical display changes from the symbol depiction 12 of the display region 6 to the symbol depiction 12 of the display region 10, wherein once again this also depends on which part of the surface of the item of cookware 18 is arranged in which occupied column area 3a to 3f. Moreover, in addition to the change of optical display from the display region 6 to the display region 10, the alteration to the position is also displayed by illuminating different light sources 13 of the symbol depiction 12 of the display field 10.

The control unit 17 is preferably also configured such that when activating a display region 6 this only remains active for a predetermined time interval, the cooking phase also being able to be adjusted within this time interval. If no actuation and/or operation takes place within this time interval, preferably this display region 6 is deactivated again.

The invention claimed is:

1. A stove top, comprising:
   a stove top plate having at least one area-connected cooking zone with a plurality of predefined cooking areas for placement of an item of cookware in variable positions;
   a display unit formed on the stove top plate for displaying information about a position of the item of cookware on the cooking zone, said display unit having a first display field in which a plurality of separate display regions are fixedly arranged adjacent to one another, each said display region displaying a reduced symbol depiction of the cooking zone, and each of the plurality of separate display regions being positionally correlated with a corresponding cooking area; and
   lighting devices assigned to each of the display regions, the lighting devices configured to illuminate the reduced symbol depictions of the cooking zone in at least a plurality of partial areas, the illuminated plurality of partial areas corresponding to at least one of different surfaces or different surface-areas.

2. The stove top of claim 1, wherein the symbol depictions are each constructed from a plurality of light sources of the assigned lighting device, said light sources being arranged geometrically according to a surface of the cooking zone.

3. The stove top of claim 2, wherein the light sources are arranged in a matrix.

4. The stove top of claim 2, wherein the light sources are arranged in at least a 5×5 matrix.

5. The stove top of claim 1, wherein the first display field extends over at least 80% of a width of the cooking zone.

6. The stove top of claim 1, wherein at least 4 of the symbol depictions are arranged in a row adjacent to one another.

7. The stove top of claim 6, wherein the at least 4 of the symbol depictions are arranged in a row equally spaced apart in the row.

8. The stove top of claim 1, wherein at least 5 of the symbol depictions are arranged in a row adjacent to one another.

9. The stove top of claim 8, wherein the at least 5 of the symbol depictions are arranged in a row equally spaced apart in the row.

10. The stove top of claim 1, further comprising value display fields configured adjacent to the symbol depictions, respectively, for displaying a cooking phase.

11. The stove top of claim 10, wherein the value display fields are arranged laterally adjacent to the symbol depictions.

12. The stove top of claim 1, further comprising a control unit configured, depending on an identification of the at least one item of cookware on the cooking zone, to display optically a partial area of the symbol depiction corresponding to that located on the cooking zone and in terms of size to the at least one item of cookware, by activating the lighting device functionally assigned to the symbol depiction.

13. The stove top of claim 1, further comprising a control unit configured to detect an alteration to a position of the one item of cookware on the cooking zone and, depending on a type of alteration to the position, to do at least one of: change a display of the position from one of the symbol depictions to another one of the symbol depictions, or display the alteration to the position in a single one of the symbol depictions.

14. The stove top of claim 13, wherein the type of alteration to the position is a direction of the alteration to the position.

15. The stove top of claim 1, wherein the display unit has a second display field configured to select a cooking phase of a partial area of the cooking zone occupied by the item of cookware.

16. The stove top of claim 15, wherein the second display field is arranged in one of two ways, a first way in which the second display field is arranged as a strip parallel to the first display field, a second way in which the first display field is configured between the second display field and the cooking zone, viewed in a depth direction of the stove top plate.

17. The stove top of claim 15, wherein the symbol depictions are arranged in a row, viewed in a depth direction of the stove top plate, said second display field with a smallest selectable cooking phase value being arranged adjacent to a first one of the symbol depictions in the row.

18. The stove top of claim 15, wherein the symbol depictions are arranged in a row, viewed in a depth direction of the stove top plate, said second display field with a largest selectable cooking phase value being arranged adjacent to a last one of the symbol depictions in the row.

19. The stove top of claim 1, wherein the plurality of cooking areas are provided by a plurality of columns, wherein each of the plurality of separate display regions are aligned within a corresponding column.

20. The stove top of claim 19, further comprising a control unit configured to activate only the one of the symbol depictions for the optical display where areas occupied in one of the plurality of columns, in comparison with other occupied column areas, are occupied by a largest part of a surface of a base of the item of cookware.

21. The stove top of claim 19, wherein each of the plurality of columns is aligned with only one display region.

22. A method for operating a stove top a stove top plate having at least one area-connected cooking zone with a plurality of predefined cooking areas for placement of an item of cookware in variable positions, said method comprising:

fixedly arranging adjacent to one another a plurality of separate display regions, in a first display field of a display unit, configured on the stove top plate for displaying information about a position of the item of cookware on the cooking zone, wherein each of the plurality of separate display regions are positionally correlated with a corresponding cooking area;

enabling a display in each of the display regions of a reduced symbol depiction of the cooking zone; and illuminating each reduced symbol depiction by a lighting device in at least a plurality of partial areas, the illuminated plurality of partial areas corresponding to at least one of different surfaces or different surface-areas.

23. The method of claim 22, further comprising displaying, depending on an identification of the at least one item of cookware on the cooking zone, optically a partial area of the symbol depiction corresponding to that located on the cooking zone and in terms of size to the at least one item of cookware, by activating the lighting device functionally assigned to the symbol depiction.

24. The method of claim 22, further comprising detecting an alteration to a position of an item of cookware on the cooking zone; and, depending on a type of alteration to the position, do at least one of: changing a display of the position from one of the symbol depictions to another one of the symbol depictions, or displaying the alteration to the position in a single one of the symbol depictions.

25. The method of claim 24, wherein the type of alteration to the position is a direction of the alteration to the position.

* * * * *